(12) United States Patent
Tang et al.

(10) Patent No.: US 11,885,690 B2
(45) Date of Patent: Jan. 30, 2024

(54) HIGH-PRECISION NON-CONTACT TEMPERATURE MEASUREMENT DEVICE

(71) Applicant: NATIONAL CHUNG SHAN INSTITUTE OF SCIENCE AND TECHNOLOGY, Taoyuan (TW)

(72) Inventors: Shiang-Feng Tang, Taoyuan (TW); Shun-Lung Yen, Taoyuan (TW); Kun-Chi Lo, Taoyuan (TW); Wen-Jen Lin, Taoyuan (TW)

(73) Assignee: NATIONAL CHUNG SHAN INSTITUTE OF SCIENCE AND TECHNOLOGY, Taoyuan (TW)

( * ) Notice: Subject to any disclaimer, the term of this patent is extended or adjusted under 35 U.S.C. 154(b) by 367 days.

(21) Appl. No.: 17/124,523

(22) Filed: Dec. 17, 2020

(65) Prior Publication Data

US 2021/0190596 A1 Jun. 24, 2021

(30) Foreign Application Priority Data

Dec. 20, 2019 (TW) .................................. 108146954

(51) Int. Cl.
*G01J 5/068* (2022.01)
*G01J 5/00* (2022.01)
*G01J 5/80* (2022.01)

(52) U.S. Cl.
CPC ................. *G01J 5/068* (2022.01); *G01J 5/80* (2022.01); *G01J 2005/0077* (2013.01)

(58) Field of Classification Search
None
See application file for complete search history.

(56) References Cited

U.S. PATENT DOCUMENTS

| 2005/0041397 A1* | 2/2005 | Alford | .................... H01L 23/38 |
| | | | 361/720 |
| 2013/0236199 A1* | 9/2013 | Yamamoto | ......... G03G 15/2039 |
| | | | 399/33 |

FOREIGN PATENT DOCUMENTS

WO WO-2019013764 A1 * 1/2019 ........... B29C 64/364

* cited by examiner

*Primary Examiner* — Erica S Lin

(57) ABSTRACT

A high-precision non-contact temperature measurement device includes: a thermal insulation box made of a thermal insulation material and having therein a receiving space; a dynamic constant-temperature feedback control module for controlling temperature of the receiving space; and a non-temperature-sensing thermal imager disposed in the receiving space. The device achieves system thermal insulation within a non-contact temperature measurement gauge, maintains the overall closed system dynamically at constant temperature, compensates for effects of internal chip self-heating effect and visual field background temperature variation, and finally calculates average temperature of surfaces of a target precisely with an imaging, non-contact temperature measurement gauge and a temperature calibration algorithm widely used in thermal-imaging non-contact temperature measurement.

5 Claims, 3 Drawing Sheets

HIGH-PRECISION NON-CONTACT TEMPERATURE MEASUREMENT DEVICE

CROSS-REFERENCE TO RELATED APPLICATION

This non-provisional application claims priority under 35 U.S.C. § 119(a) on Patent Application No(s). 108146954 filed in Taiwan, R.O.C. on Dec. 20, 2019, the entire contents of which are hereby incorporated by reference.

BACKGROUND OF THE INVENTION

1. Field of the Invention

The present disclosure relates to temperature measuring devices, and in particular to a temperature measuring device capable of achieving high-precision non-contact temperature measurement with a calibration non-temperature-sensing thermal imager.

2. Description of the Related Art

In recent years, infrared sensors are developed to switch gradually from defense and weaponry applications to military-civilian integration applications and even consumer-oriented industrial applications, for example, measuring temperature with infrared sensors. From structural perspective, conventional infrared temperature sensors fall within the following categories: thermopile sensors, pyroelectric infrared sensors (PIS) and microbolometer sensors. The microbolometer sensors are made of vanadium oxide (VOx), amorphous silicon (a-Si) or barium strontium titanate (BST).

Existing non-contact temperature measurement technology is based on the aforesaid three categories of sensors, developing non-contact temperature measurement gauges widely in use. The non-contact temperature measurement gauges, which are lightweight, capable of high-resolution thermal imaging, low-noise, and low-power-consumption, are provided in the form of microbolometer sensors. Although the microbolometer sensors have the aforesaid advantages, a fixed operating voltage or current is required for operation of the microbolometer sensors in order to carry out non-contact temperature measurement. An underlying readout integrated circuit (ROIC) may work so long a time period that its thermal-imaging temperature sensing chip brings a self-heating effect, and thus the ROIC directly outputs voltage or transimpedance voltage level drift, thereby leading to reduction in temperature measurement precision.

Therefore, a non-contact temperature measurement gauge in wide use not only has its ROIC including a reference substrate temperature monitoring sensing unit (reference pixel), but the periphery of the ROIC is attached to a contact-style thermosensitive temperature sensing unit, a calibration shutter in the front of the ROIC is attached to the sensing unit to therefore perform numerical computation, such as the operating temperature compensation and ambient temperature compensation, with the contact-style thermosensitive temperature sensing unit and related software according to the level drift at any time to perform direct output voltage or transimpedance voltage level drift regression compensation computation, so as to maintain non-contact high-precision temperature measurement performance for a long period of time.

The core thermal-imaging chips in most thermal-imaging non-contact temperature measurement gauges absorb radiation heat with a microbolometer focal plane array and then read electrical signals with a readout integrated circuit (ROIC). After that, the ROIC measures a current (or voltage) level according to a resistance change arising from crystalline phase variation of the VOx material on the microbolometer. Then, the actual temperature is calculated with the measured current (or voltage) value. However, the measured current (or voltage) value often carries errors and thus renders temperature measurement imprecise, because of sensor manufacturing process variations, the self-heating effect of the operating temperature of focal plane array chips, and visual field background temperature.

Therefore, plenty of manufacturers developed appropriate calibration methods in an attempt to augment measurement accuracy. To maintain a constant operating temperature and accurate feedback to the visual field background shutter reference temperature, nearly all commercially-available thermal-imaging non-contact temperature measurement gauges each have therein the thermosensitive temperature sensing unit which complicated calibration rules are applied to, thereby adding to the complexity of the integration and implementation of the calibration computation hardware and the manufacturing of the system.

Take a conventional thermal-imaging non-contact temperature measurement gauge as an example, to perform the temperature-sensing function, booting must be followed by waiting for at least 30 minutes, preferably allowing the system to attain a dynamically stable operating temperature (the difference between the casing temperature and the thermal imager sensing core FPA chip temperature is relatively constant) in order to perform the temperature-sensing function. Furthermore, unevenness and single-point temperature calibration is carried out to ensure typical determined temperature precision of ±5° C. or ±5%. To attain a higher degree of precision, such as ±1° C. or ±2%, it is necessary to perform regression computation on the MCU or PC with a complicated polynomial regression parameter algorithm. In case of an abrupt, intense change in the ambient temperature (in the vicinity of a high temperature source or low temperature source), the overall system dynamic temperature difference will be ≥±3° C., leading to the deterioration of the temperature sensing precision of the temperature-sensing gauge; thus, it is necessary to wait and attain temperature thermal equilibrium (temperature dynamic constancy) between the system and the surroundings, repeat the temperature-sensing calibration procedure in accordance with the ongoing focal plane array chip operating temperature and visual field background temperature, normalize the outputted intensity signal value, perform the entire system self-adaptation selected reverse computation, and finally measure the target temperature precisely.

Therefore, to enhance and maintain the temperature measurement accuracy of the conventional thermal-imaging non-contact temperature measurement gauges for a long period of time, it is necessary to introduce plenty of complicated hardware designs and intricate algorithm applications to the software and hardware of the system. However, major drawbacks of the prior art are as follows:

1. Fail to maintain effectively a constant system temperature but resort to a system passive dynamic thermal equilibrium mechanism, and thus fail to efficiently enable the entire system to operate at a constant operating temperature with a view to measuring the target temperature precisely.

2. Require additional sensors for monitoring thermal-imaging chip temperature sensor and visual field background shutter temperature, thereby complicating the system design and manufacturing. Furthermore, conventional, commercially-available thermal imagers lack any support from system temperature-sensing sensor hardware and calibration algorithm (temperature-sensing mechanism constant-temperature feedback) and thus can only perform thermal-imaging monitoring to the detriment of wide application of temperature sensing.

BRIEF SUMMARY OF THE INVENTION

An objective of the present disclosure is to provide a high-precision non-contact temperature measurement mechanism which dispenses with the need to be informed of focal plane array chip operating temperature and visual field background shutter reference temperature, entails performing system thermal insulation on an overall non-contact temperature measurement gauge and regulating the entire temperature measuring system at a dynamically constant overall system temperature in accordance with the overall closed system dynamic temperature to compensate for the self-heating effect and the adverse effects of the visual field background temperature variation, and finally calculating precisely the average temperature of the surface of a target with a temperature calibration algorithm widely applicable to thermal-imaging non-contact temperature measurement, using an imaging, non-contact temperature measurement gauge.

To achieve at least the above objective, the present disclosure provides a high-precision non-contact temperature measurement device, comprising: a thermal insulation box made of a thermal insulation material and having therein a receiving space; a dynamic constant-temperature feedback control module for controlling temperature of the receiving space; and a non-temperature-sensing thermal imager disposed in the receiving space.

Regarding the high-precision non-contact temperature measurement device, the thermal insulation material is PE.

Regarding the high-precision non-contact temperature measurement device, the dynamic constant-temperature feedback control module comprises a temperature sensor, a temperature control module, a temperature feedback control unit and a power module, the temperature sensor being disposed in the receiving space and adapted to measure temperature of the receiving space before generating a feedback signal, the temperature feedback control unit receiving the feedback signal and then generating a control signal, the temperature control module receiving the control signal and then controlling the temperature of the receiving space, the power module providing electric power for driving the temperature sensor, the temperature control module and the temperature feedback control unit.

Regarding the high-precision non-contact temperature measurement device, the temperature control module is a TEC (thermoelectric cooling) chip.

Regarding the high-precision non-contact temperature measurement device, the temperature feedback control unit is an MCU, ASIC or PC.

The high-precision non-contact temperature measurement device of the present disclosure further comprises a heat-dissipating mechanism disposed on the outer surface of the thermal insulation box.

The high-precision non-contact temperature measurement device of the present disclosure further comprises a front cover disposed on a lateral surface of the thermal insulation box. The lateral surface and the front cover each have a hole. The non-temperature-sensing thermal imager observes a target through the holes.

DETAILED DESCRIPTION OF THE INVENTION

To facilitate understanding of the object, characteristics and effects of this present disclosure, embodiments together with the attached drawings for the detailed description of the present disclosure are provided.

The present disclosure entails creating a thermal insulating closed system from a conventional, commercially-available non-temperature-sensing thermal-imaging module, such that the entire module mechanism operates dynamically at a constant temperature. In other words, the present disclosure enables the system to receive dynamic constant-temperature feedback and thus create a mechanism constant-temperature state with a thermoelectric cooling (TEC) module and a temperature sensing unit (a bridge amplification circuit and a Proportional-Integral and Derivative (PID) temperature controlling unit, which can be replaced with a combination of a commercially-available Micro Control Unit (MCU) and a temperature control Application Specific Integrated Circuit (ASIC) chip). The system temperature does not undergo great variation (usually ≤±1° C.), because the system is a thermal insulating system and given an ambient temperature variation (≥±3° C.). Unlike a temperature-sensing thermal-imaging system, a non-temperature-sensing thermal-imaging system dispenses with a temperature sensor which is otherwise disposed in the vicinity of a thermal-imaging array chip and a visual field background shutter, measures the instant temperature parameter, and computes complicated temperature compensation values, so as to not only simplify the design and manufacturing of the temperature-sensing thermal imager but also attain precisely measured target temperature for a long period of time.

Figure 1:
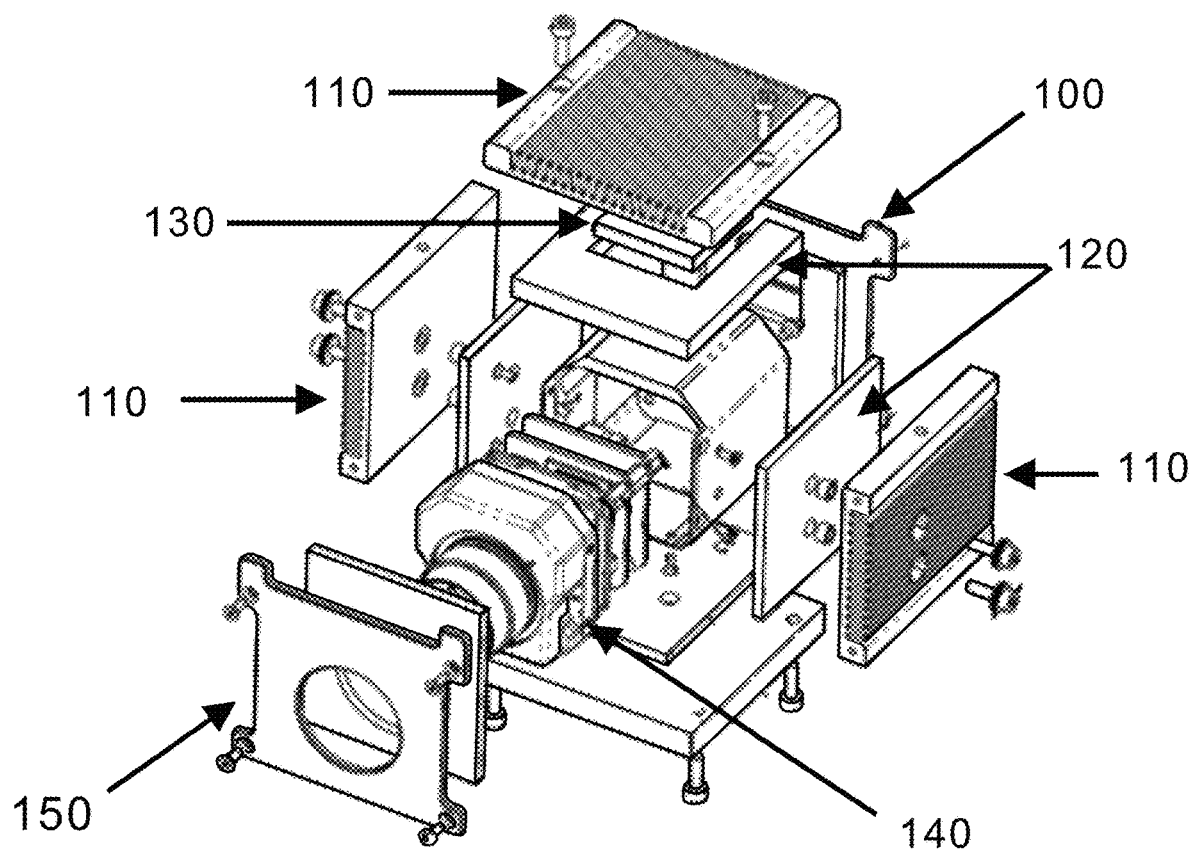
FIG. 1 is a schematic view of a high-precision non-contact temperature measurement device of the present disclosure.

Referring to FIG. 1, there is shown a schematic view of a high-precision non-contact temperature measurement device of the present disclosure. In an embodiment of the present disclosure, a high-precision non-contact temperature measurement device (100) comprises: a thermal insulation box (120) made of a thermal insulation material, wherein the thermal insulation material is polyethylene thermal insulating material, and the thermal insulation box (120) has therein a receiving space; a dynamic constant-temperature feedback control module (130) comprising a temperature sensor, a temperature control module, a temperature feedback control unit and a power module, the temperature sensor is disposed in the receiving space and measures the temperature of the receiving space and generates a feedback signal, the temperature feedback control unit receives the feedback signal and generates a control signal, the temperature control module receives the control signal and controls the temperature of the receiving space, the power module provides electric power for driving the temperature sensor, the temperature control module and the temperature feedback control unit, the temperature control module is a TEC (thermoelectric cooling) chip, and the temperature feedback control unit is an MCU, ASIC or Personal Computer; a non-temperature-sensing thermal imager (140) disposed in the receiving space; a heat-dissipating mechanism (110) disposed on an outer surface of the thermal insulation box (120), with a front cover (150) disposed on a lateral surface of the thermal insulation box (120). The lateral surface and the front cover (150) each have a hole. The non-temperature-sensing thermal imager (140) observes a target through the holes.

The present disclosure achieves a Quasi thermal insulating (PE thermal insulating material) closed system. To enable the entire module mechanism to attain a dynamically constant temperature, in the high-precision non-contact temperature measurement device (100) of the present disclosure, the thermoelectric cooling (TEC) module is combined with the temperature sensor, and a bridge type power amplifier circuit module. The PID temperature control module performs negative feedback dynamic constant temperature control, and finally, a PC or commercial MCU or temperature control ASIC performs entire system dynamic constant temperature feedback controlling. Therefore, the system comprises the active, dynamic constant-temperature-regulated thermal insulating closed system comprising a thermal insulating closed framework disposed at the periphery of a non-temperature-sensing thermal imager and a dynamic constant-temperature feedback control mechanism according to the present disclosure.

Figure 2:
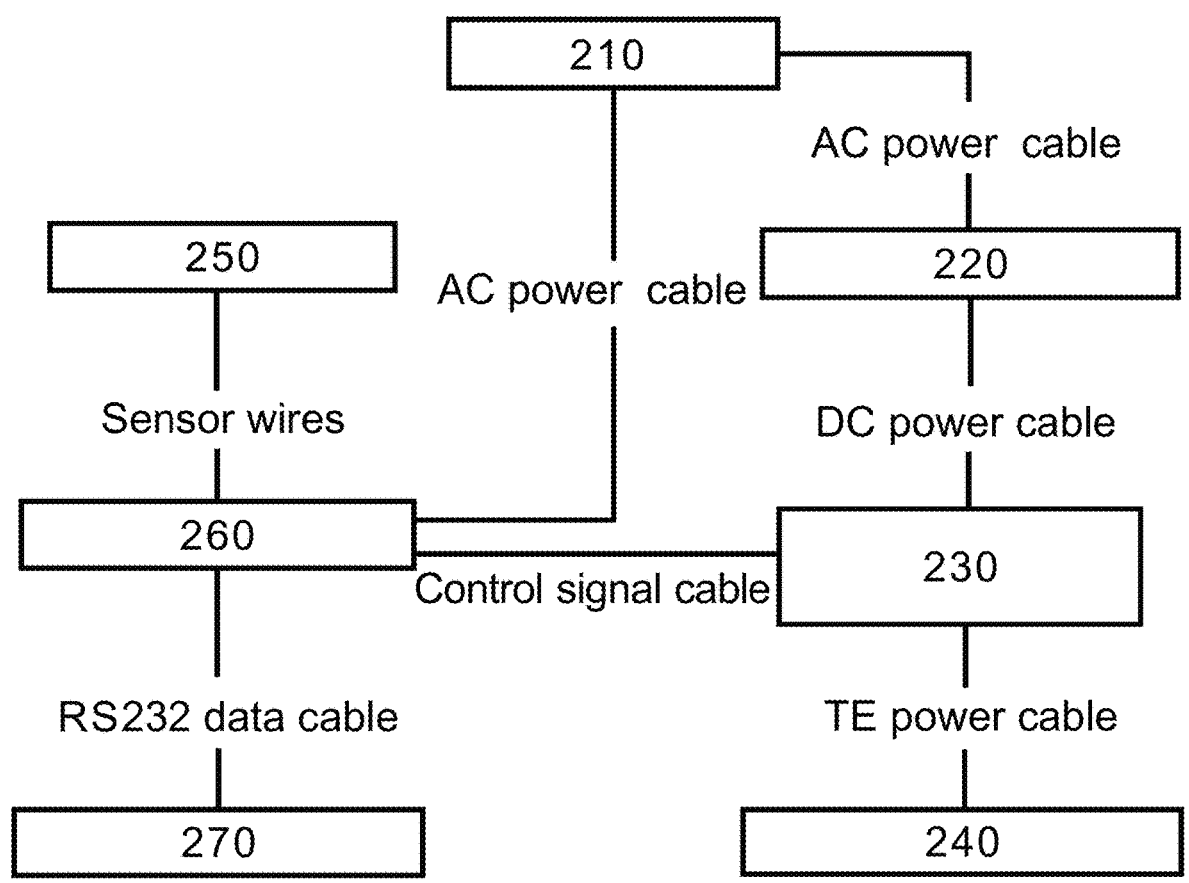
FIG. 2 is a block diagram of a dynamic constant-temperature feedback control module of the present disclosure.

Referring to FIG. 2, there is shown a block diagram of a dynamic constant-temperature feedback control module of the present disclosure. The present disclosure enables the visual field background shutter temperature and the thermal-imaging chip in a conventional, commercially-available non-temperature-sensing thermal imager to quickly attain a system-preconfigured temperature and maintain a dynamic, constant state, thereby greatly enhancing the precision and practicability of temperature sensing.

The dynamic constant-temperature feedback control module comprises a temperature sensor, a temperature control module, a temperature feedback control unit and a power module. In this embodiment, the dynamic constant-temperature feedback control module is an Alternating Current (AC) power module (210), an Alternating Current/Direct current (AC/DC) power module (220), a bridge power amplifier circuit module (230), a cooling chip and heat-dissipating mechanism (240), a temperature sensor (250), a temperature control module (260), and an MCU or ASIC control unit (270). The AC power module (210) provides power to the AC/DC power module (220). The AC/DC power module (220) provides power to the bridge power amplifier circuit module (230). The bridge power amplifier circuit module (230) provides power to the cooling chip and heat-dissipating mechanism (240). The temperature sensor (250) sends a feedback signal to the temperature control module (260). The temperature control module (260) sends the feedback signal to the MCU or ASIC control unit (270). The MCU or ASIC control unit (270) sends a control signal to the temperature control module (260). The temperature control module (260) sends the control signal to the bridge power amplifier circuit module (230). The bridge power amplifier circuit module (230) can achieve the effect of temperature controlling by receiving the control signal and adjusting the power supply to the cooling chip and the heat-dissipating mechanism (240) to thereby achieve temperature control. Therefore, in this embodiment, the temperature feedback control unit is the MCU or ASIC control unit, whereas the power module is the AC power module, AC/DC power module and bridge power amplifier circuit module.

Figure 3:
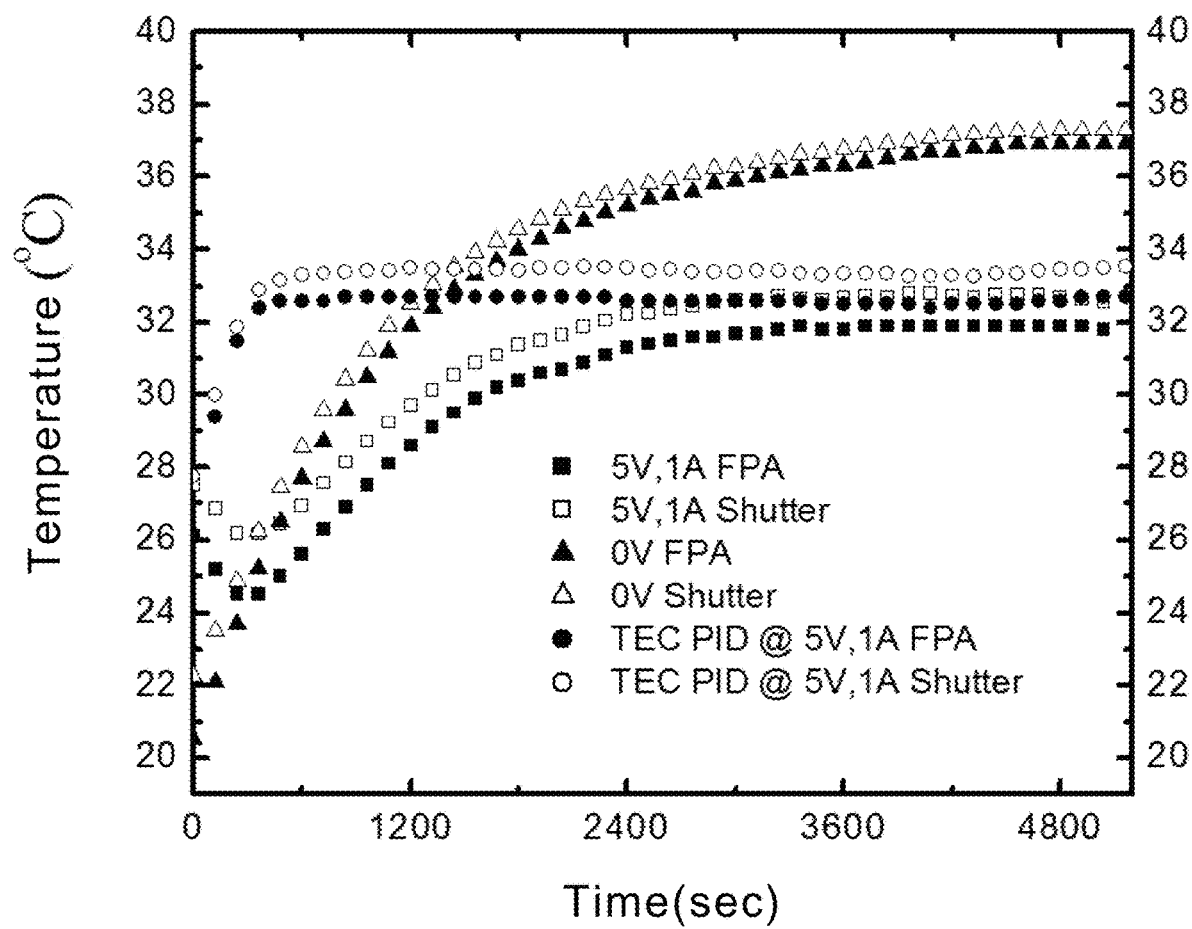
FIG. 3 is a graph of measurement results of a thermal-imaging non-contact temperature measurement gauge of the present disclosure.

Referring to FIG. 3, there is shown a graph of measurement results of a thermal-imaging non-contact temperature measurement gauge of the present disclosure. The horizontal axis is the operating time of the internal focal plane array wafer, and the vertical axis is the temperature. A comparison of the three results is included in FIG. 3. The first result is based on using an active, dynamic, constant-temperature-regulated thermal insulating closed system with a PID temperature control module (i.e., a thermal-imaging non-contact temperature measurement gauge comprising a dynamic active constant-temperature control mechanism according to the present disclosure). The second result is based on using a thermal imager without external PID to control the focal plane array (FPA) chip and the background shutter temperature of the field of view (take a general commercial thermal imager as an example). The third result is based on using commercial temperature measuring thermal imaging instrument controlled by constant power. According to an embodiment of the present disclosure, the visual field background shutter temperature and the focal plane array chip in the thermal-imaging non-contact temperature measurement gauge comprising a dynamic active constant-temperature control mechanism can quickly attain a dynamic constant temperature in five minutes. In this embodiment, the dynamic constant temperature (variation $\leq \pm 1°$ C.) can be maintained for a long time, i.e., at least 80 minutes. The conventional, commercially-available temperature-sensing thermal imager (exclusive of an external PID control module) takes at least 30 minutes to attain temperature constancy variation of $\leq \pm 3°$ C. and subsequent increasingly slow rise of FPA and shutter temperature and takes 80 minutes to attain temperature constancy variation of $\leq \pm 1°$ C. As shown in the graph of temperature versus time of operation of the focal plane array chip in a commercially-available temperature-sensing thermal imager for constant power control, five minutes before the commencement of constant power operation sees overly great power causing rapid decrease in the FPA and shutter temperature, five minutes after the commencement of constant power operation sees gradual rise of temperature because of the self-heating effect, and 40 minutes after the commencement of constant power operation sees temperature constancy variation of $\leq \pm 1°$ C. Therefore, temperature-sensing thermal imagers (with PID control or constant power condition), regardless of whether they have PID temperature control condition, attain a dynamic constant temperature better than the conventional, commercially-available temperature-sensing thermal imagers. 15 minutes after the commencement of constant power operation sees attainment of a steady state, a great reduction in the time taken by the thermal imager to wait for system temperature constancy during the temperature sensing process, and resultant effective enhancement of temperature sensing precision.

Around 18 minutes (FPA chip and shutter temperature reaches 33° C. approximately) after being booted, the commercially-available temperature-sensing thermal imager (also known as general temperature-sensing thermal imager) performs non-unevenness and single-point temperature calibration once and records a two hours' process of measuring (measurement frequency=1 time/second) continuously the temperature of a panel standard black body radiation source of 30° C. and 80° C. at a distance of 1 meter, and its related temperature data (average temperature, highest temperature, and lowest temperature) is shown in the table below.

| General non-temperature-sensing thermal imager | BB30° C. | BB80° C. |
| --- | --- | --- |
| AVG | 27.53 | 76.26 |
| MIN | 26.50 | 75.50 |
| MAX | 29.50 | 77.50 |
| STD | 0.51 | 0.31 |

Its temperature sensing precision conforms with the range of temperature sensing precision (±5° C. or ±5%) and temperature variation (both standard deviations of 0.51 and 0.34° C. are ≤0.6° C.) configured by conventional manufacturers.

The thermal-imaging non-contact temperature measurement gauge (disclosed according to the present disclosure and known as constant-temperature temperature-sensing thermal imager) comprises the dynamic active constant-temperature control mechanism. Around 18 minutes (FPA chip and shutter temperature reaches 33° C. approximately) after being booted, the thermal-imaging non-contact temperature measurement gauge performs unevenness and single-point temperature calibration once and records a two hours' process of measuring (measurement condition is identical to general temperature-sensing thermal imager-preconfigured target temperature) continuously the temperature of a panel standard black body radiation source of 30° C. and 80° C., and its related is shown in the table below.

| Temperature-constant temperature thermal imager | BB30° C. | BB80° C. |
| --- | --- | --- |
| AVG | 30.57 | 80.50 |
| MIN | 29.71 | 79.77 |
| MAX | 31.54 | 81.15 |
| STD | 0.28 | 0.21 |

Measurement of standard low-temperature and high-temperature panel targets reveals their average temperature, highest temperature and lowest temperature to be 30.57° C., 29.71° C., 31.54° C. (target temperature 30° C.) and 80.50° C., 79.77° C., 81.15° C. (target temperature 80° C.), respectively, with temperature measurement precision of ±0.5° C. The temperature measurement variation (standard deviations) are 0.28 and 0.21° C., which both are ≤0.3° C.

The aforesaid data shows that the thermal-imaging non-contact temperature measurement gauge surpasses commercially-available temperature-sensing thermal imagers in temperature measurement precision and temperature measurement variation. The present disclosure is directed to a high-precision non-contact temperature measurement mechanism which dispenses with the need to be informed of focal plane array chip operating temperature, visual field background shutter reference temperature and entails performing system thermal insulation in the overall non-contact temperature measurement gauge, regulating the overall system temperature of the entire temperature measuring system according to the overall closed system dynamic temperature under a dynamic, constant condition, compensating for self-heating effect and the adverse effects of the visual field background temperature variation, and finally calculating precisely the average temperature of the surface of a target with a temperature calibration algorithm widely applicable to thermal-imaging non-contact temperature measurement, using an imaging, non-contact temperature measurement gauge, so as to measure an intensity signal (this numerical value approximates to the standard constancy value configured at the time of delivery of the system) with an ROIC by the system dynamic constant-temperature feedback method of the present disclosure, then effectuate compensation with a single-point temperature level, calculate heat radiation (R, B, F, O) calibration regression of temperature by the entire system self-adaptation selected reverse computation, so as to calculate the average temperature of the surface of a target precisely. Therefore, the high-precision non-contact temperature measurement mechanism of the present disclosure attains the same degree of temperature measurement precision as conventional, commercially-available high-precision non-contact thermal imagers, measures temperature precisely for a long period of time at a background operating temperature which changes abruptly and transiently, greatly reduces the complexity of the hardware manufacturing of temperature-sensing thermal imaging system and the load of software computation, and is capable of monitoring a target temperature for a long period of time and greatly reducing procurement cost of temperature-sensing thermal imagers. Therefore, the high-precision non-contact temperature measurement mechanism of the present disclosure is applicable to monitoring industrial automated abnormal temperature, giving body temperature alerts to patients, and giving abnormal high temperature alerts in public space. With its cost being expected to decrease greatly, the temperature-sensing thermal imager system of the present disclosure will be popular with consumers and the industrial sector.

While the present disclosure has been described by means of specific embodiments, numerous modifications and variations could be made thereto by those skilled in the art without departing from the scope and spirit of the present disclosure set forth in the claims.

What is claimed is:

1. A high-precision non-contact temperature measurement device, comprising:
   a thermal insulation box made of a thermal insulation material and having therein a receiving space;
   a dynamic constant-temperature feedback control module for controlling temperature of the receiving space, the dynamic constant-temperature feedback control module comprising a thermoelectric cooling chip for cooling; and
   a non-contact temperature-sensing thermal imager disposed in the receiving space, the thermal insulation box mounted to the non-contact temperature-sensing thermal imager;
   wherein a front cover is disposed on a lateral surface of the thermal insulation box and the lateral surface and the front cover each have a hole and the non-contact temperature-sensing thermal imager observes a target through the holes and thereby the thermal insulation box covers a majority of all sides of the non-contact temperature-sensing thermal imager except for the holes;
   wherein the thermoelectric cooling chip is in contact with the non-contact temperature-sensing thermal imager and absorbs heat and releases the heat away from the non-contact temperature-sensing thermal imager thereby providing a cooling effect for temperature control.

2. The high-precision non-contact temperature measurement device of claim 1, wherein the thermal insulation material is polyethylene.

3. The high-precision non-contact temperature measurement device of claim 1, wherein the dynamic constant-temperature feedback control module comprises a temperature sensor, the thermoelectric cooling chip as a temperature control module, a temperature feedback control unit and a power module, the temperature sensor is disposed in the receiving space, the temperature sensor measures temperature of the receiving space and generates a feedback signal, the temperature feedback control unit receives the feedback signal and generates a control signal, the thermoelectric cooling chip as the temperature control module receives the control signal and controls the temperature of the receiving space by dissipating heat away from the non-contact temperature-sensing thermal imager, the power module provides electric power for driving the temperature sensor, the thermoelectric cooling chip as the temperature control module and the temperature feedback control unit.

4. The high-precision non-contact temperature measurement device of claim 3, wherein the temperature feedback control unit is a Micro Control Unit, an Application Specific Integrated Circuit or a Personal Computer.

5. The high-precision non-contact temperature measurement device of claim 1, further comprising a heat-dissipating mechanism disposed on an outer surface of the thermal insulation box.

\* \* \* \* \*